UNITED STATES PATENT OFFICE.

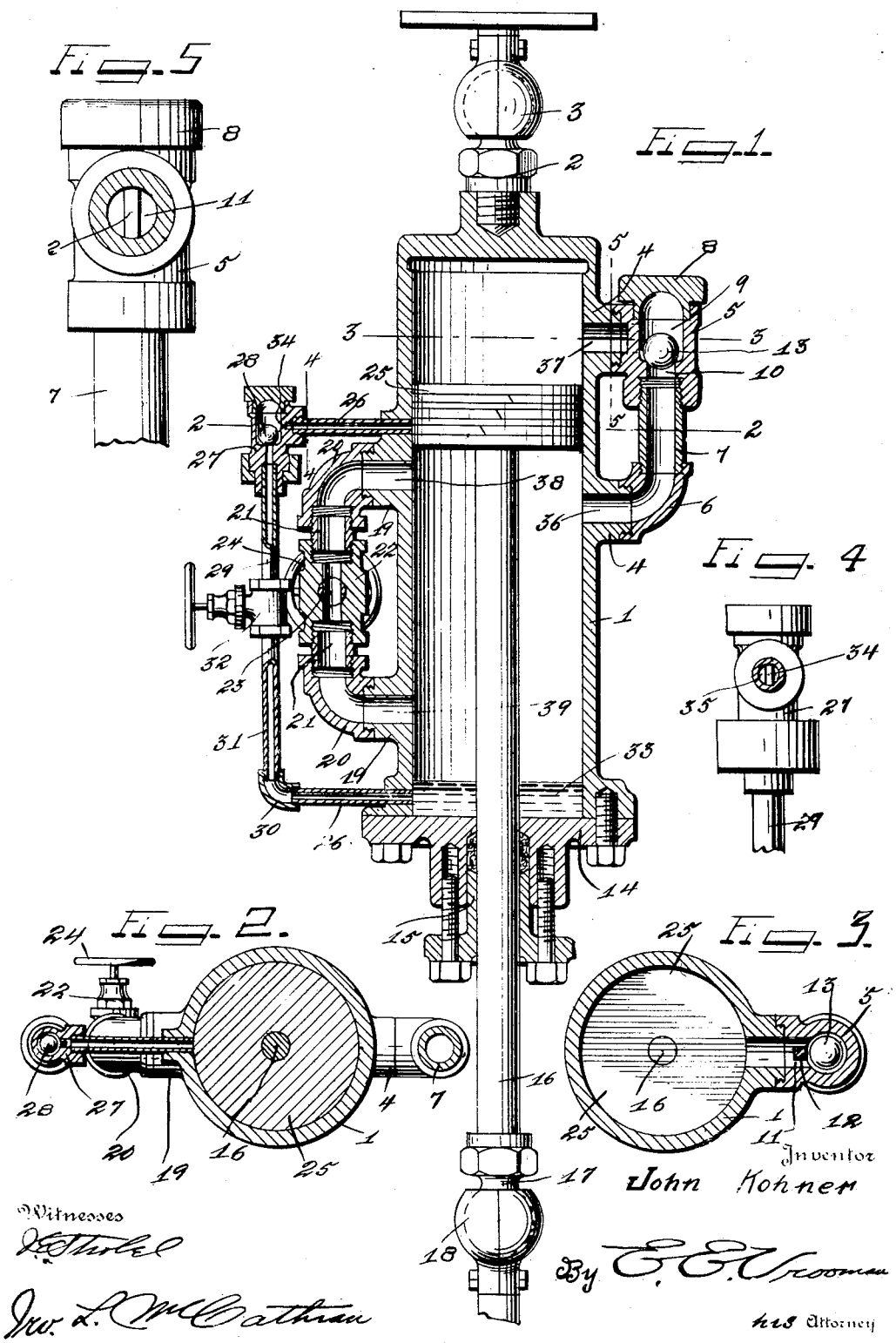

JOHN KOHNER, OF LEWISTON, MINNESOTA.

AIR-SPRING AND SHOCK-ABSORBER.

1,117,057. Specification of Letters Patent. Patented Nov. 10, 1914.

Application filed September 27, 1913. Serial No. 792,161.

*To all whom it may concern:*

Be it known that I, JOHN KOHNER, citizen of the United States, residing at Lewiston, in the county of Winona and State of Minnesota, have invented certain new and useful Improvements in Air-Springs and Shock-Absorbers, of which the following is a specification, reference being had therein to the accompanying drawing.

This invention relates to shock absorbers and has for its object the production of an efficient shock absorber which is especially adapted to be attached to vehicles such as automobiles and the like.

One of the principal objects of the invention is the production of a simple and efficient means for producing an even cushion so as to prevent sudden jars to a vehicle.

Another object of the invention is the production of an efficient means for transmitting the compressed air from one end of the compression cylinder to the other end thereof.

Other objects and advantages of this invention will appear throughout the following specification and claims.

In the accompanying drawings:—Figure 1 is a vertical section through the device. Fig. 2 is a section taken on the line 2—2, of Fig. 1. Fig. 3 is a section taken on the line 3—3, of Fig. 1. Fig. 4 is a section taken on the line 4—4, of Fig. 1. Fig. 5 is a section taken on the line 5—5 of Fig. 1.

Referring to the drawings it will be seen that 1 designates the cylinder which is provided at its upper end with a threaded ball cap 2 which ball cap 2 fits in a socket 3 which is adapted to be secured to the body of an automobile or other vehicle in any suitable manner. The cylinder 1 is provided upon one side thereof with a pair of projecting collars 4, one of which collars engages a casing 5 and the other collar engages an elbow 6. The casing 5 and the elbow 6 are connected by means of an intermediate pipe section 7, and the upper end of the casing 5 is normally closed by means of a cap 8. A pocket 9 is formed in the casing 5, and this casing is provided with an inlet aperture 10 and an outlet aperture 11. The outlet aperture 11 is provided with a vertical bridge portion 12 which is adapted to close the aperture 11 to such an extent as to prevent the ball valve 13 from passing through the aperture 11 and closing the passage therethrough.

A head 14 is bolted to the lower end of the cylinder 1 and carries a stuffing box 15 of the usual construction for the purpose of constituting a tight joint around the piston rod 16. The piston rod 16 carries a ball 17 at one end thereof, which ball fits in a socket 18, which socket is in turn attached to an axle or other portion of a vehicle for accomplishing the desired result. The cylinder 1 is provided with a plurality of projecting collars 19 upon the opposite side of the cylinder to the collars 4, and these collars 19 engage elbows 20. The elbows 20 support pipe sections 21, which pipe sections 21 are connected to a valve casing 22. A valve 23 is placed within the valve casing 22 and is operated by means of a wheel 24 for allowing the valve 23 to be opened and closed to suit the desire of the operator of the machine. The valve 23 is normally adapted to be held open so as to constitute an efficient passageway for the air in case the piston 25 carried by the piston rod 16 is suddenly thrown downwardly. This passageway just mentioned will allow the compressed air to have a free passage around the piston and in this way allow a more free cushioning medium. A lubricating system for lubricating the piston 25 is also employed in connection with the cylinder 1, and this system comprises a pair of laterally extending pipes 26 extending from the cylinder, the upper pipe 26 carrying a casing 27 in which is mounted a check ball 28 for the purpose of normally closing the passage through the vertical pipe 29 supporting the casing 27. The lower pipe 26 carries an elbow 30 which elbow supports a vertically extending pipe 31, and a valve casing 32 is interposed between the pipes 29 and 31 so as to allow the passage through the pipes 29 and 31 to be manually closed. The lower pipe 26 of the lubricating system communicates with the lower end of the cylinder 1, and the cylinder 1 is adapted to be partially filled at the lower end thereof with lubricating material, such as indicated at 33, as for instance oil or other suitable substance. The compressed air within the cylinder 1 is adapted to force the lubricant through the pipes 26 and 29 and 31 and also through the casing 27 for the purpose of lubricating the piston 25. The remaining portion of the lubricating material in the cylinder 1 is adapted to lubricate the piston rod 16, and it will be seen by carefully considering Fig. 1 that the lower pipe 26 is placed above the extreme lower end of the cylinder 1 so as to allow the small supply of lubricating material to remain in the bottom of the casing 1. By carefully considering Fig. 4 it will be seen that the casing 27 like the casing 5 is provided with a bridge portion 34 across the aperture 35 which communicates with the upper pipe 26 of the lubricating system so as to prevent the check ball 28 from closing the passage through the aperture 35.

From the foregoing description it will be seen that a very simple and efficient mechanism has been produced for the purpose of perfecting an air cushion to be used upon vehicles and the like, and the operation of the device above described is as follows: As the cylinder 1 is drawn upwardly relative to the piston head 25 the compressed air below the piston head 25 will pass through the port 36 and be discharged through the port 37 into the upper end of the cylinder 1 and above the piston head 25. This is made possible for the reason that the check ball 13 will be raised from its seat and allow the compressed air to pass through the casing 5. The air above the piston head 25 cannot return in the same way for the check ball 13 will recede and prevent the passage of air therethrough. As soon as the piston head 25 is below the port 38 the air will pass through said port 39 and be discharged above the piston head 25 through the port 38. At the same time the piston head 25 moves downwardly the compressed air will force the lubricating liquid to be discharged through the pipes 31 and 29 and also through the pipes 26, thereby lubricating the sides of the cylinder which are engaged by the piston head 25.

It should be understood that the piston head 25 may be normally held in any desired position within the cylinder, but the piston head may be preferably held in a normal position as shown in Fig. 1. Upon the downward movement of the casing 1 upon the piston head the air in the upper end of the cylinder 1 will be compressed and constitute an efficient cushion for the piston head 25. As the piston moves downwardly in the casing and the casing 1 moves upwardly relative to the piston due to the jar of the machine carrying the shock absorber, the air will pass out through the port 39 and be discharged through the port or opening 38 above the cylinder head 25. As the piston again descends the air above the piston head will be forced up through the aperture 36 through the pipe 7 through the check valve casing 5 and be discharged out through the aperture 37, thereby greatly decreasing the resistance under the piston head 25. In the meantime, however, the lubricant in the bottom of the casing 1 will be forced up through the lubricating passageway above described, and in this manner keep the piston head thoroughly lubricated.

It should be understood that after the lubricant is forced through the pipe 26 into the cylinder 1 and above the piston head 25, the lubricant will flow around the inner face of the cylinder 1 and through the constant reciprocation of the piston head 25 within the cylinder 1, the lubricant will gradually trickle down along the inner face of the cylinder 1 between the piston head 25, and in this manner return to the lower end of the cylinder 1. It should be understood, however, that the piston head 25 is adapted to fit quite closely in engagement with the inner face of the cylinder 1, and it should be understood that it is the nature of the lubricant to gradually soak between two portions which are not integrally connected together which will be the case between the piston head 25 and the inner face of the cylinder 1.

Having thus described the invention what is claimed as new, is:—

1. A shock absorber comprising a cylinder, a piston, said cylinder provided with a passageway formed thereon, a second passageway formed upon said cylinder, said first mentioned passageway having one end communicating near the bottom of said cylinder and the other end communicating near the end of the central portion of said cylinder, said second passageway having one end communicating with said cylinder near the central portion thereof and the other end communicating with said cylinder near the upper end thereof, a check valve carried within said second mentioned passageway and adapted to prevent the passage of air through said second mentioned passageway in one direction whereby a cushioning medium will be employed in the upper end of said cylinder, and a lubricating means communicating with the lower end of said cylinder and also communicating with said cylinder near the upper end thereof for conveying lubricant from the bottom of said cylinder to the top of said cylinder and efficiently lubricate said piston.

2. A shock absorber comprising a cylinder, a piston, a passageway forming a communication between the bottom of said cylinder and also communicating with said cylinder near the central portion thereof, means for controlling the opening and closing of said passageway, a second passageway having one end communicating with said cylinder near the central portion thereof and the other end communicating with said cylinder near the upper end thereof, a check valve carried by said second mentioned passageway for permitting the flow of air through said second mentioned passageway in one direction and prevent the flow of air through said second mentioned passageway in the other direction whereby an air cushion will be produced in the upper end of said cylinder for constituting a cushion for said piston, a lubricating passageway carried by said cylinder and communicating with the bottom and top of said cylinder for forcing lubricant from the bottom of said cylinder to the top of said cylinder and keeping said piston thoroughly lubricated, and means for preventing the return flow of lubricant through said lubricating passageway.

In testimony whereof I hereunto affix my signature in presence of two witnesses.

JOHN KOHNER.

Witnesses:
  WILLIAM BURNS,
  H. L. BUCK.